G. P. WARNER.
SLED-PROPELLER.
No. 185,149. Patented Dec. 5, 1876.
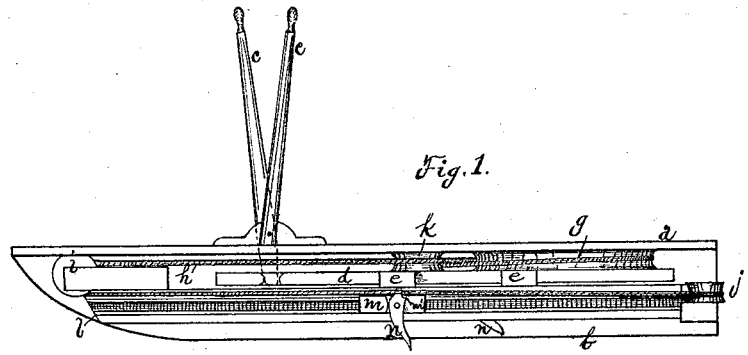
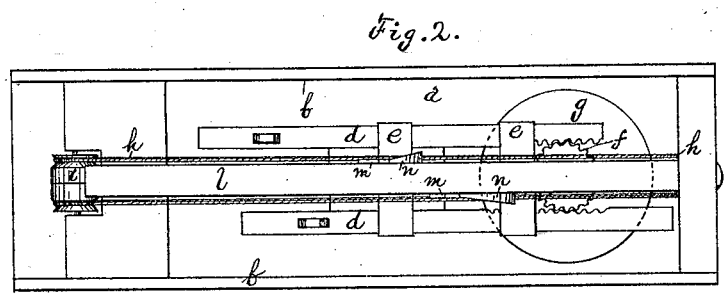
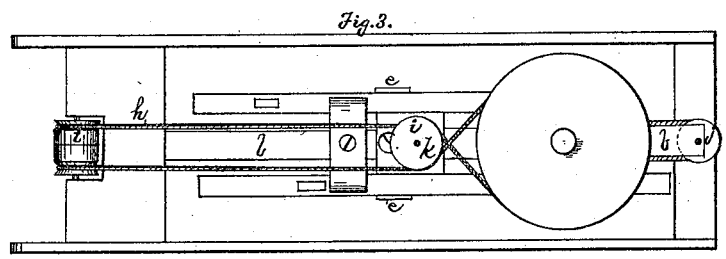
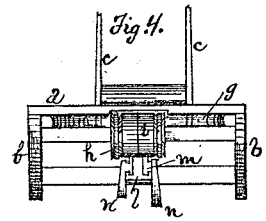
WITNESSES:
Robt. F. Gaylord
John M. Gooden
INVENTOR:
George P. Warner
By Wm. E. Simonds,
Atty.
THE GRAPHIC CO. N.Y.

UNITED STATES PATENT OFFICE.

GEORGE P. WARNER, OF NORTHAMPTON, MASSACHUSETTS.

IMPROVEMENT IN SLED-PROPELLERS.

Specification forming part of Letters Patent No. 185,149, dated December 5, 1876; application filed October 14, 1876.

*To all whom it may concern:*

Be it known that I, GEORGE P. WARNER, of Northampton, in the county of Hampshire and State of Massachusetts, have invented certain new and useful Improvements pertaining to a Sled-Propeller, of which the following is a specification, reference being had to the accompanying drawings, where—

Figure 1 is a side view, a part broken away to show the mechanism under the sled. Fig. 2 is a bottom view. Fig. 3 is a top view, with the seat of the sled removed. Fig. 4 is a front-end view.

The letter $a$ denotes the seat, and $b\ b$ the sides, with the bottoms shaped into "runners."

The operator, sitting on the sled, reciprocates the pivoted levers $c\ c$ alternately with his hands, and thereby alternately reciprocates the racks $d\ d$, hung in way-plates $e\ e$. These racks give reciprocal rotation to the pinion $f$ and to the band-wheel $g$, to which the pinion is fast. This reciprocal rotation of the band-wheel imparts corresponding (longitudinal) reciprocation to the band $h$, which is endless, and runs from the band-wheel $g$ around the front band-spool $i$, and then back to and around the rear band-spool $j$. For convenience' sake, the band is crossed around the spool $k$, just as it leaves the wheel $g$.

In opposite sides of the way-block $l$ are hung the slides $m\ m$, and to the sides thereof are pivoted the dogs $n\ n$, the upper ends of which are attached to the band $h$.

When the dog moves forward, actuated by the band, its point rises rearwardly, so as to travel over the path or road readily. When the dog, actuated by the band, moves rearward, the point of the dog is prevented from rising, so as to disengage with the snow, by the dog striking against the shoulder $m'$ on the side of the slide. This holds the dog to engagement with the snow, and moves the sled forward. While one dog is moving rearward the other is moving forward. The action of the cord in moving a dog rearward is such as to tend to press the point of the dog downward and into the snow.

I claim as my invention—

1. In combination, way-block $l$, slide $m$, pivoted dog $n$, and actuating-cord $h$, all substantially as described, and for the purpose set forth.

2. In combination, levers $c$, racks $d$, pinion and band-wheel $f\ g$, spools $i\ j$, cord $h$, dogs $n$, slides $m$, and way-block $l$, all substantially as described, and for the purpose set forth.

GEORGE P. WARNER.

Witnesses:
WM. EDGAR SIMONDS,
ROBT. F. GAYLORD.